US010552817B2

(12) United States Patent
Green et al.

(10) Patent No.: US 10,552,817 B2
(45) Date of Patent: Feb. 4, 2020

(54) CHANGING EMAIL TEXT BASED ON PAYMENT STATUS

(71) Applicant: GOOGLE INC., Mountain View, CA (US)

(72) Inventors: Travis Harrison Kroll Green, Washington, DC (US); Phillip Neal Sharp, Sunnyvale, CA (US); Brian Maximilian Salay, Belmont, CA (US)

(73) Assignee: GOOGLE LLC, Mountain View, CA (US)

(*) Notice: Subject to any disclaimer, the term of this patent is extended or adjusted under 35 U.S.C. 154(b) by 267 days.

(21) Appl. No.: 15/716,462

(22) Filed: Sep. 26, 2017

(65) Prior Publication Data
US 2018/0018653 A1 Jan. 18, 2018

Related U.S. Application Data

(63) Continuation of application No. 13/731,106, filed on Dec. 30, 2012, now Pat. No. 9,805,358, which is a
(Continued)

(51) Int. Cl.
*G06Q 10/10* (2012.01)
*G06Q 20/22* (2012.01)
*G06Q 20/10* (2012.01)

(52) U.S. Cl.
CPC ......... *G06Q 20/223* (2013.01); *G06Q 10/107* (2013.01); *G06Q 20/10* (2013.01); *G06Q 20/102* (2013.01)

(58) Field of Classification Search
USPC ......................................... 705/39
See application file for complete search history.

(56) References Cited

U.S. PATENT DOCUMENTS 5,677,955 A 10/1997 Doggett et al.
5,699,528 A 12/1997 Hogan
(Continued)

FOREIGN PATENT DOCUMENTS

CN 101950451 A 1/2011
KR 10-2004-0084557 A 10/2004
WO 2014/105937 A1 7/2014

OTHER PUBLICATIONS

Madamba, "U.S. Office Action issued in copending U.S. Appl. No. 13/731,098, filed Dec. 30, 2012", dated Oct. 26, 2018, 17 pages.
(Continued)

*Primary Examiner* — William E Rankins
(74) *Attorney, Agent, or Firm* — Johnson, Marcou & Isaacs, LLC

(57) ABSTRACT

An email payment system and method to provide users with the ability to initiate and send payments to one more recipients via email messaging. A user interface is provided in an email client that allows a user to insert payment with the email. Payment details are collected through one or more payment modals displayed in the email client. A payment object is inserted into the body of the email and is displayed to both the sender and recipient. The payment details captured in the payment object are communicated to a payment processor. The payment processor uses electronic payment accounts associated with the corresponding sender and recipient email addresses to identify the relevant electronic payment accounts and transfer the payment between said accounts. A status of the payment transaction is tracked and displayed within the payment object of the emails residing in both the sender and recipient email client.

15 Claims, 11 Drawing Sheets

Related U.S. Application Data continuation of application No. 13/728,478, filed on Dec. 27, 2012, now Pat. No. 8,762,272.

(56) References Cited

U.S. PATENT DOCUMENTS

| | | | |
|---|---|---|---|
| 6,246,996 | B1 | 6/2001 | Stein et al. |
| 6,684,248 | B1 | 1/2004 | Janacek et al. |
| 6,775,689 | B1 | 8/2004 | Raghunandan |
| 7,120,606 | B1* | 10/2006 | Ranzini ............... G06Q 20/02 705/64 |
| 7,194,437 | B1 | 3/2007 | Britto et al. |
| 7,533,064 | B1 | 5/2009 | Boesch |
| 7,552,185 | B1 | 6/2009 | Kirzner et al. |
| 7,610,222 | B2 | 10/2009 | Neofytides et al. |
| 7,644,037 | B1 | 1/2010 | Ostrovsky |
| 7,783,709 | B2 | 8/2010 | Liezenberg et al. |
| 7,844,546 | B2 | 11/2010 | Fleishman et al. |
| 8,321,511 | B1 | 11/2012 | Friend et al. |
| 8,571,975 | B1 | 10/2013 | Lehman et al. |
| 8,762,272 | B1 | 6/2014 | Cozens et al. |
| 2004/0148252 | A1 | 7/2004 | Fleishman |
| 2005/0071229 | A1* | 3/2005 | Mashinsky ............ G06Q 30/02 705/14.26 |
| 2005/0177518 | A1 | 8/2005 | Brown |
| 2006/0089906 | A1 | 4/2006 | Rowley |
| 2006/0168016 | A1* | 7/2006 | Barrett ................ G06Q 10/107 709/206 |
| 2007/0010879 | A1 | 1/2007 | Feinerman et al. |
| 2007/0106736 | A1 | 5/2007 | Shepherd |
| 2007/0168266 | A1* | 7/2007 | Questembert .......... G06Q 20/06 705/35 |
| 2008/0091606 | A1 | 4/2008 | Grecia |
| 2008/0282338 | A1 | 11/2008 | Beer |
| 2008/0288376 | A1 | 11/2008 | Panthaki et al. |
| 2009/0006233 | A1 | 1/2009 | Chemtob |
| 2009/0112766 | A1 | 4/2009 | Hammad et al. |
| 2009/0112768 | A1 | 4/2009 | Hammad et al. |
| 2009/0132423 | A1 | 5/2009 | Liu |
| 2009/0327126 | A1 | 12/2009 | Schoenberg et al. |
| 2010/0070419 | A1 | 3/2010 | Vadhri |
| 2011/0035581 | A1 | 2/2011 | Maller |
| 2011/0055077 | A1 | 3/2011 | French et al. |
| 2011/0106675 | A1 | 5/2011 | Perlman |
| 2011/0125644 | A1 | 5/2011 | Fleishman et al. |
| 2011/0142217 | A1 | 6/2011 | Goldfarb |
| 2012/0110087 | A1 | 5/2012 | Culver et al. |
| 2013/0080319 | A1 | 3/2013 | Greenstone |
| 2014/0188702 | A1 | 7/2014 | Green et al. |
| 2014/0188714 | A1 | 7/2014 | Cozens et al. |
| 2014/0188727 | A1 | 7/2014 | Cozens et al. |
| 2014/0279447 | A1* | 9/2014 | Dorsey ................ G06Q 20/10 705/39 |

OTHER PUBLICATIONS

U.S. Appl. No. 16/434,156 to Cozens et al., filed Jun. 6, 2019.
U.S. Appl. No. 13/731,098 to Cozens et al., filed Dec. 30, 2012.
U.S. Appl. No. 13/731,106 to Green et al., filed Dec. 30, 2012.
U.S. Appl. No. 13/728,478 to Cozens et al., filed Dec. 27, 2012.
"Chinese Office Action issued in Chinese Application No. 201380071460.7". dated Jun. 2, 2017, 4 pages of English Translation and 3 pages of Chinese Office Action.
"Chinese Office Action issued in Chinese Application No. 201380071460.7", dated Jan. 5, 2017, 7 pages of English Translation and 6 pages of Chinese Office Action.
"Chinese Office Action issued in Chinese Application No. 201380071460.7", dated Apr. 18, 2016, 6 pages of English Translation and 5 pages of Chinese Office Action.
Breugelmans, "European Office Action issued in European Application No. 13867938.6 ", dated Aug. 18, 2017, 8 pages.
Breugelmans, "Extended European Search Report issued in European Application No. 13867938.6", dated Sep. 7, 2016, 9 pages.
Goodbody, "U.S. Office Action issued in copending U.S. Appl. No. 13/728,478, filed Dec. 27, 2012", dated Jun. 5, 2013, 25 pages.
Goodbody, "U.S. Office Action issued in copending U.S. Appl. No. 13/728,478, filed Dec. 27, 2012", dated Oct. 18, 2013, 28 pages.
Goodbody, "U.S. Office Action issued in copending U.S. Appl. No. 13/731,106, filed Dec. 30, 2012", dated Aug. 11, 2014, 36 pages.
Goodbody, "U.S. Office Action issued in copending U.S. Appl. No. 13/731,106, filed Dec. 30, 2012", dated Jan. 7, 2015, 44 pages.
"Modal and Model", American Heritage Dictionary of the English Language, 2009, downloaded May 19, 2013, 2 pages.
Guadamuz, "PayPal: the legal status of C2Cpayment systems", Computer Law and Security Report, vol. 20, No. 4, 2004, 7 pages.
Kungpisdan, "Accountability in Centralized Payment Environments", ISCIT, IEEE, 2009, 6 pages.
Madamba, "U.S. Office Action issued in copending U.S. Appl. No. 13/731,098, filed Dec. 30, 2012", dated Aug. 14, 2014, 13 pages.
Madamba, "U.S. Office Action issued in copending U.S. Appl. No. 13/731,098, filed Dec. 30, 2012", dated Dec. 15, 2016, 15 pages.
Madamba, "U.S. Office Action issued in copending U.S. Appl. No. 13/731,098, filed Dec. 30, 2012", dated Oct. 15, 2015, 15 pages.
Madamba, "U.S. Office Action issued in copending U.S. Appl. No. 13/731,098, filed Dec. 30, 2012", dated Jun. 1, 2016, 18 pages.
Madamba, "U.S. Office Action issued in copending U.S. Appl. No. 13/731,098, filed Dec. 30, 2012", dated Dec. 3, 2014, 7 pages.
Madamba, "U.S. Office Action issued in copending U.S. Appl. No. 13/731,098, filed Dec. 30, 2012", dated Apr. 6, 2015, 8 pages.
Madamba, "U.S. Office Action issued in copending U.S. Appl. No. 13/731,098, filed Dec. 30, 2012", dated Jun. 15, 2017, 18 pages.
McHugh, "The Growth of Person to Person Electronic Payments", Chicago Field Letter, The Federal Reserve Bank of Chicago, No. 180, Aug. 2002, 4 pages.
Oh, "International Search Report and Written Opinion issued in International Application No. PCT/US2013/077777", dated Apr. 24, 2014, 14 pages.
Rankins, "U.S. Office Action issued in copending U.S. Appl. No. 13/731,106, filed Dec. 30, 2012", dated Feb. 17, 2016, 14 pages.
Rankins, "U.S. Office Action issued in copending U.S. Appl. No. 13/731,106, filed Dec. 30, 2012", dated Nov. 22, 2016, 16 pages.
Rankins, "U.S. Office Action issued in copending U.S. Appl. No. 13/731,106, filed Dec. 30, 2012", dated Sep. 9, 2015, 38 pages.
Rankins, "U.S. Office Action issued in copending U.S. Appl. No. 13/731,106, filed Dec. 30, 2012", dated Aug. 8, 2016, 14 pages.
Becamel, "International Preliminary Report on Patentability issued in International Application No. PCT/US2013/077777", dated Jul. 9, 2015, 11 pages.
"European Preliminary Opinion issued in European Application No. 13867938.6", dated Feb. 5, 2019, 17 pages.
Breugelmans "European Decision to Refuse issued in European Application No. 13867938.6", dated Feb. 28, 2019, 19 pages.
"Chinese Office Action issued in Chinese Application No. 201711164575.7", dated Oct. 31, 2018, 05 pages of Chinese Office Action and 05 pages if English Translation.
Madamba, "U.S. Office Action issued in copending U.S. Appl. No. 13/731,098, filed Dec. 30, 2012", dated Aug. 8, 2018, 17 pages.
Madamba, "U.S. Office Action issued in copending U.S. Appl. No. 13/731,098, filed Dec. 30, 2012", dated Dec. 19, 2017, 17 pages.

* cited by examiner

CHANGING EMAIL TEXT BASED ON PAYMENT STATUS

RELATED APPLICATIONS

This application claims priority to and is a continuation of U.S. patent application Ser. No. 13/731,106, filed Dec. 30, 2012, and entitled "Changing Email Text Based on Payment Status," which is a continuation of U.S. patent application Ser. No. 13/728,478 filed Dec. 27, 2012, and entitled "Management of Emails Containing Payments." The complete disclosure of the above-identified priority applications is hereby fully incorporated herein by reference.

TECHNICAL FIELD

The present disclosure relates to systems and methods for conducting electronic peer-to-peer payments. More particularly, the present disclosure provides systems and methods for initiating and completing electronic payments by email messaging.

BACKGROUND

People are increasingly using electronic payment methods to settle their personal accounts with other individuals instead of directly exchanging cash or check payments. For example, a person may send an electronic payment to pay another individual for their portion of a shared dinner tab, or to pay for an item purchased by another person on their behalf. Services exist that allow a user to set up a payment account on a central server and access that account via a web browser or other application. The user may access their payment account, designate a recipient, and have the funds transferred to the recipient's payment account electronically. Email is a ubiquitous communication tool and is commonly used to request, remind, or document a payment that is about to be made because it provides a clear record of the transaction. However, existing systems do not allow a user to initiate and send a payment from their email client.

SUMMARY

In certain example aspects described herein, a method for sending payments by email using an email payment system comprises presenting a payment object modal in the email message to collect payment transaction details from the sender, receiving the payment transaction details from the sender via the payment object modal, generating a payment object comprising the payment details, inserting the payment object in the email message, communicating the payment transaction details to a payment processor; and routing by the email message with the payment object to an email server for delivery to a recipient.

In certain example aspects described herein, a method for integrating email message addressing and payment transaction addressing using an email payment system comprises addressing an email message from a sender comprising a payment object via which the sender will pay a payment amount, determining a number of recipient addresses in the "to" field of the email message, determining a number of recipient addresses in the "cc" and "bcc" field of the email message, providing a payment object in the email message sent to each recipient in the "to" field of the email message, and removing the payment object from each email message sent to a recipient in the "cc" or "bcc" fields of the email message.

In certain other example embodiments described herein, a method for updating the status of email payment objects in an email client using an email payment system comprises receiving a notification that an email message comprising a payment object was communicated from a sender of the email message to a recipient of the email message, setting an initial processing status of the payment object, requesting an update of the processing status from a payment processor, receiving an update of the processing status from the payment processor, and updating the payment object with the updated processing status.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
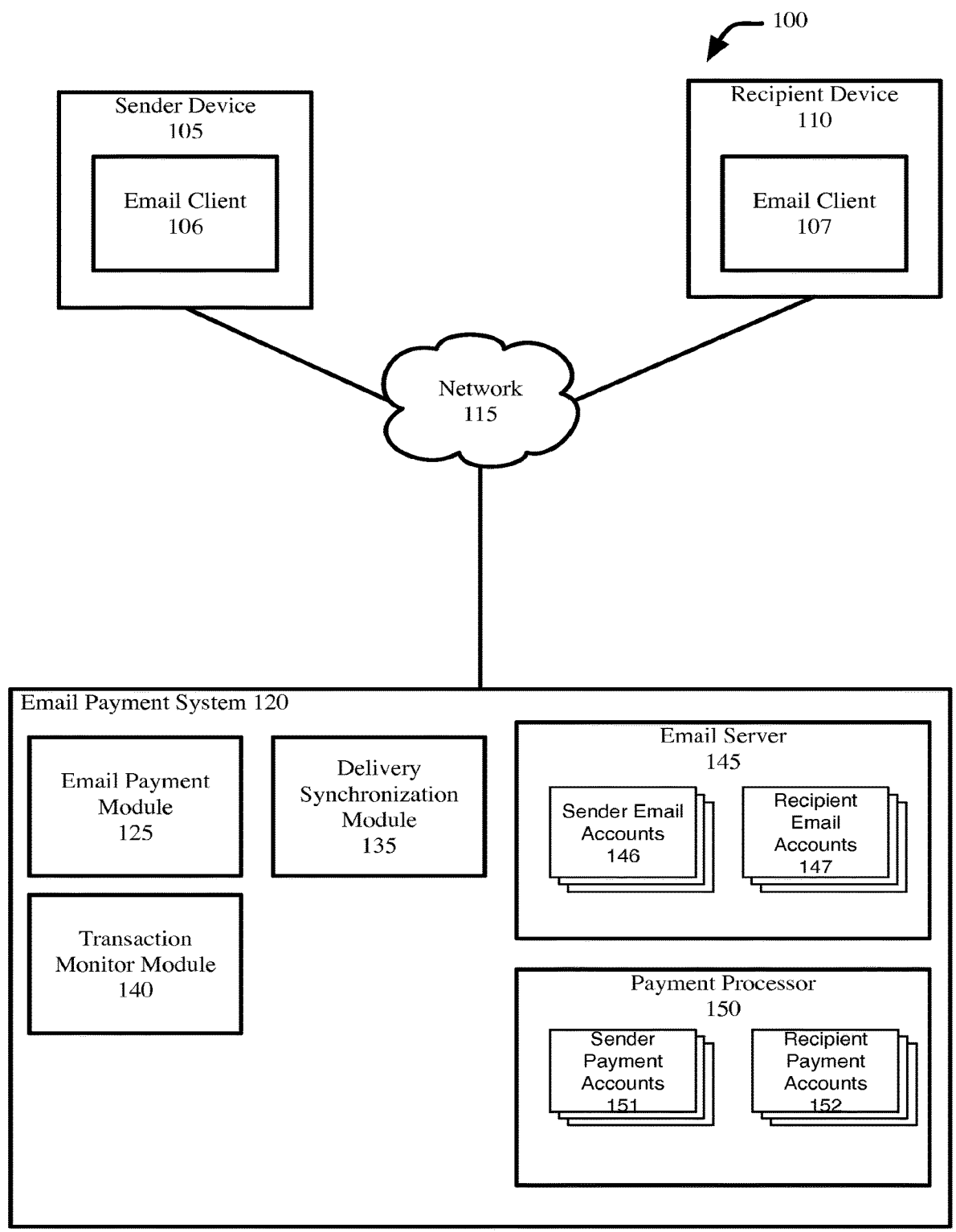
FIG. 1 is a block diagram depicting a system for making electronic payments via email messaging, in accordance with certain example embodiments.

Embodiments herein provide computer-implemented techniques for sending and receiving electronic payments by email messaging. The embodiments described herein provide a user interface that allows a sender to generate and insert a payment object directly in the body of an email while composing the email. The payment object may comprise a payment or a payment request. The sender's email account is linked to a corresponding electronic payment account. Likewise, the recipient's email account may be linked to an electronic payment account. If the recipient email account is not associated with an electronic payment account, the email payment system may prompt the recipient to register for an electronic payment account. An electronic payment account may be linked to an email account by use of the email address of the email account as an account identifier for the electronic payment account. The electronic payment account is hosted on a payment processor system that is part of, or is in communication with, the email payment system. The electronic payment account may have multiple payment instruments, such as multiple credit cards or a bank account, stored in the electronic payment account from which an sender can select to make a payment. The system then delivers the payment object to the recipient's email account and sends the payment from the sender's electronic payment account to a recipient's electronic payment account. Users may access the email payment option in their email client on any remote user device supporting the email client, including, but not limited to, personal computers, mobile phones, and tablet computers. One or more application program interfaces (APIs) facilitate communication between the email payment system, the email server, the sender and recipient email clients, and the payment processor to complete the delivery of the email and transfer of funds between the sender's electronic payment account and the recipient's electronic payment account.

To initiate a payment request or payment, a sender composes an email to a recipient and indicates an intent to pay the recipient. In certain example embodiments, the intent can be indicated by clicking on a button or other user interface object within the email client. In other example embodiments, the email payment system may analyze the email for payment signals. For example, the email payment system may analyze text in an email for such payment signals as "$" or a phrase such as "I owe you" in the body of the email.

Upon detection of one or more payment signals or another user indication of an intent to make a payment, the email payment system presents an email payment suggestion modal in the email composition window of the email client, providing the sender an opportunity to include a payment object with the email. In user interface design, a modal window is a child window that requires users to interact with it before they can return to operating the parent application, thus preventing workflow on the application main window. The payment object modal provides fields to collect payment details. Payment details can include, but are not limited to, a recipient, a payment instrument, and a payment amount. The email payment system may first verify that sufficient funds are available for the selected payment instrument before proceeding with the electronic payment. In certain example embodiments, if sufficient funds arc not available, the email payment system will present a "modify payment account" modal that allows the sender to modify the electronic payment account, for example, by selecting an alternative payment instrument or by transferring additional funds to the electronic payment account. In addition, the email payment system may conduct a risk assessment and, if a potential security issue is identified, present a security authorization challenge to the sender before finalizing the payment object.

Once the payment details have been confirmed by the sender, a payment object is generated by the email payment system and inserted into the email. The payment object is displayed to the sender in the email and may indicate at least the recipient and the dollar amount of the payment or the request for payment. Once the sender clicks send in the email client (or before if desired), the email payment system verifies that the recipient is not forbidden from receiving the payment. For example, if certain external regulations prevent payment transactions to certain geographical regions, the email payment system will verify that the recipient does not have a corresponding electronic payment account outside the allowed geographic transaction region. For example, the email payment system may verify the physical address associated with a recipient's payment account or detect IP addresses associated with previous logins to the recipient's electronic payment account. If the recipient is not restricted from receiving an email payment, the email payment system communicates payment details collected during preparation of the payment object to a payment processor. In certain example embodiments, the email payment system ensures synchronous delivery of the payment to the recipient's payment account and the email to the recipient's email account. For example, the email payment system may pause the payment processor tracking the status of the payment transaction from posting the transaction in the sender and recipient's electronic payment accounts until the email is sent or delivered. Likewise, the email payment system may pause the email server from delivering the email with the payment object until confirmation that the payment processor has confirmed receipt of the payment details.

An email containing the payment object is delivered to the designated recipient. The payment object is displayed to the recipient in the email. The presented payment object may indicate at least the sender or recipient and the dollar amount. If the payment object is a request for payment, the payment object will further provide buttons or other user interface objects that allow the recipient to accept or reject the payment request. Upon acceptance or rejection of the payment request by the recipient, a confirmation email may be sent to the sender regarding the status of the payment request. If the payment object is a payment, the payment object will further provide buttons or other user interface objects that allow the recipient to accept or reject the payment or access their payment account to view additional payment transaction details.

If the payment is accepted, the acceptance is communicated to the payment processor, which finalizes the transfer of funds between the sender's payment account and the recipient's payment account. A confirmation email may then be sent to both the sender and recipient. If the payment is rejected, a follow-up email may be sent to the sender informing the sender of the recipient's decision to reject the payment. In the event that the recipient accesses their electronic payment account after the email with the payment object has been delivered to the recipient's email account, but before they have viewed the email with the payment object in their email client, notification of receipt of the payment object may also be displayed in the recipient electronic payment account interface (such as a web browser or electronic payment account application). In certain example embodiments, the recipient may accept or reject the payment object from their electronic payment account interface. In certain example embodiments, the recipient will not be notified in the recipient electronic payment account interface that the payment object has been received until the email payment system confirms the email with the payment object has been delivered to the recipient's email account.

In certain example embodiments, an email payment system provides integration between email and electronic payment transaction addressing by automatically designating the email addressee in the "to" field of the email as the recipient of the payment and ensuring that a single payment object is designated for each recipient address in the "to" field. The email payment system inserts the email address from the "to" field in a payment object modal after a sender indicates an intent to include a payment object in the email. If multiple recipients are indicated in the "to" field, the email payment system may present a multi-recipient modal and request the sender to designate a payment amount and payment instrument for those recipients in the "to" field receiving a payment. In certain example embodiments, if the recipient address is a group email address, the email payment system may load a group recipient modal and request the sender to designate a group administrator email, the group administrator being the only recipient authorized to accept or reject the payment for the group. The email payment system further analyzes the email message for recipients in the "cc" and "bcc" fields and may restrict the insertion of the payment object in the copies of the email sent to those recipients. In certain embodiments, recipients in the "cc" and "bcc" fields of the email may receive notice of the payment, but will not receive a payment directed to those recipients. Sending and processing of the email payment then proceeds as described previously.

In other example embodiments, an email payment system tracks and updates the status of the payment transaction in the sender and recipient's email message with the payment object. For example, a copy of the email message with the payment object is stored in the sender's stored folder, or a special email payments folder. The initial status in the payment object in the sender's copy of the email will indicate "awaiting action" or another indicator showing action is needed by the recipient. At the same time the payment object in the recipient's copy of the email will indicate that "action is needed" from the recipient. If the recipient accepts the payment, the sender and recipient's status are updated in the payment object of their copy of the email message with the payment object to indicate the payment is "processing." Upon completion of the payment transaction, the sender and recipient's status in the payment object of the email are updated to "completed." If the recipient rejects the payment, the sender and recipient's status in the payment object of the email are updated to "declined." Similar status updates are provided when the original payment object is a payment request. Upon acceptance of the payment request, the status updates follow a similar process as described previously regarding acceptance and rejection of a payment. In certain example embodiments, the status updates are encoded in a hypertext markup language and executed by API calls to the payment processor at regular intervals and/or prior to a request to display the email message with the email payment object. In certain other example embodiments, the payment processor sends push notifications to the email client containing the status updates.

Aspects of embodiments will be explained in more detail in the following description, read in conjunction with the figures illustrating the program flow.

Example System Architectures

Turning now to the drawings, in which like numerals represent like (but not necessarily identical) elements throughout the figures, example embodiments are described in detail.

FIG. 1 is a block diagram depicting a system for executing electronic payment transactions via email messaging. As depicted in FIG. 1, the system 100 includes network devices 105, 110, and 120 that are configured to communicate with one another via one or more networks 115.

Each network 115 includes a wired or wireless telecommunication means by which network devices (including devices 105, 110, and 120) can exchange data. The network 115 includes a wired or wireless telecommunication system or device by which network devices (including devices 105, 110, and 120) can exchange data. For example, the network 115 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer based environment.

Each network device 105, 110, and 120 includes a device having a communication module capable of transmitting and receiving data over the network 115. For example, each network device 105, 110 and 120 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 105 and 110 are operated by end-users referred to herein as senders and recipients, and network device 120 is operated by email payment system operators.

The sender device 105 and recipient device 110 are operated by senders and recipients respectively. The sender device 105 and recipient device 110 each include an email client module 106 and 107 respectively. The email client modules 106 and 107 on the sender device 105 and recipient device 110 can interact with web servers or other computing devices connected to the network 115, including the email server 145 and the payment processor 150 of the email payment system 120. The email client module 106 and 107 may be a web-based email client module accessible by a browser application or another suitable application for interacting with web page files maintained by the email payment system 120. The email client module 106 and 107 may also comprise an email software application residing and executing on the sender 105 and recipient 110 devices. As described below certain functions will be described in the context of the sender email client module 106 and other functions in the context of the recipient email client module 107. It is to be understand that the email payment system 120 enables the same functionality within each email client module 106 and 107 as a sender of an email payment in one instance may be a recipient of an email payment in another and vice versa.

The email payment system 120 is operated by an email payment system operator. In certain example embodiments the email payment system 120 comprises an email payment module 125, a delivery synchronization module 135, a transaction monitor module 140, an email server 145 and a payment processor 150.

The payment processor 150 hosts sender electronic payment accounts 151 and recipient electronic payment accounts 152 and transfers funds between said electronic payment accounts. In certain example embodiments, the sender electronic payment accounts 151 and recipient electronic payment accounts 152 are electronic wallet accounts. The sender payment accounts 151 and the recipient payment accounts 152 may have funds associated directly with the electronic payment account. Alternatively the sender electronic payment accounts 151 and recipient electronic payment accounts 152 may have other payment instruments, such as credit cards, linked to the sender electronic payment account 151 or recipient electronic payment account 152. In certain example embodiments, the payment processor 150 may be part of a third party payment processor system in communication with the email payment processor system 120. As described below, certain functions will be described in the context of the sender electronic payment accounts 151 and other functions in the context of the recipient electronic payment accounts 152. It is to be understand that the email payment system 120 enables the same functionality within each electronic payment account 151 and 152 as a sender of an email payment in one instance may be a recipient of an email payment in another and vice versa.

The email server 145 delivers email messages between sender email accounts 146 and recipient email accounts 147. As understood in the art, the delivery of an email message between a sender and a recipient may involve more than one email server 145. For example, an email message may first be sent to a first email server hosting the sender's email account and then routed to a second email server hosting the recipient's email account. The distinction between sender email accounts 146 and recipient email accounts 147 is made for ease of reference purposes only and unless specified otherwise, features and functions associated with one email account type are considered to be shared by both email account types. In certain example embodiments, the email server 145 may be part of a third party email server system in communication with the email payment processor system 120.

The email payment module 125 communicates with the sender email client module 106 and recipient email client module 107 and provides user interface objects for selecting the email payment option within the sender email client module 106, and a set of modals for display within the email and allowing the sender to provide payment details and the sender electronic payment account. The email payment module 125 further generates and inserts a payment object comprising the payment or payment request into the email message. The payment object is viewable by the sender prior to sending the email message and by the recipient upon opening the email message. The email with the payment object may also remain viewable in the sender's email account after sending the email with the payment object to the recipient. The payment object further provides user interface objects that allow the recipient to accept or reject the payment object and the sender and recipient to connect to their respective electronic payment accounts hosted on the payment processor 150. The payment object may further display a transaction status of the payment object. For example, the transaction status may reflect whether the payment object is delivered, accepted, processing, completed, or rejected. A copy of the email message with payment object is retained in the sender and recipients email accounts 146 and 147 and viewable in the email client modules 106 and 107 until deletion by the sender or recipient respectively.

The transaction monitor module 140 monitors the status of the transaction. In certain example embodiments, the transaction monitor module 140 may comprise an API encoded within the email with the payment object. For example, the API may be encoded within a hypertext markup language (HTML) or a script call. After the email with the payment object is sent, the transaction monitor module makes regular calls to the payment processor 150 to obtain a transaction status. The transaction monitor module 140 may then display the transaction status in the email with the payment object. For example, the transaction monitor module 140 may display the status in the payment object as described above, or elsewhere within the email message. For example, the transaction status may be displayed in the email message subject line of the email message with the payment object.

The delivery synchronization module 135 communicates between the payment processor 150 and email server 145. The delivery synchronization module 135 makes regular calls to both the payment processor 150 and email server 145 to determine the status of the delivery of the email with the payment object and receipt of the payment details by the payment processor 150, pausing each system as needed to provide synchronization between the delivery of the email with payment object and the posting of payment from the sender electronic payment account 151 and designated recipient electronic payment account 152.

It will be appreciated that the network connections shown in FIG. 1 are one example and other means of establishing a communications link between the network devices 105, 110, and 120 can be used. Moreover, those having ordinary skill in the art and having the benefit of the present disclosure will appreciate that the sender device 105, the recipient device 110, and the email payment system 120 illustrated in FIG. 1 can have any of several other suitable computer system configurations.

Example Processes

The components of the example operating environment 100 are described hereinafter with reference to the example methods illustrated in FIGS. 2-10. The methods illustrated in FIG. 2 are described with reference to the components illustrated in FIG. 1.

Figure 2:
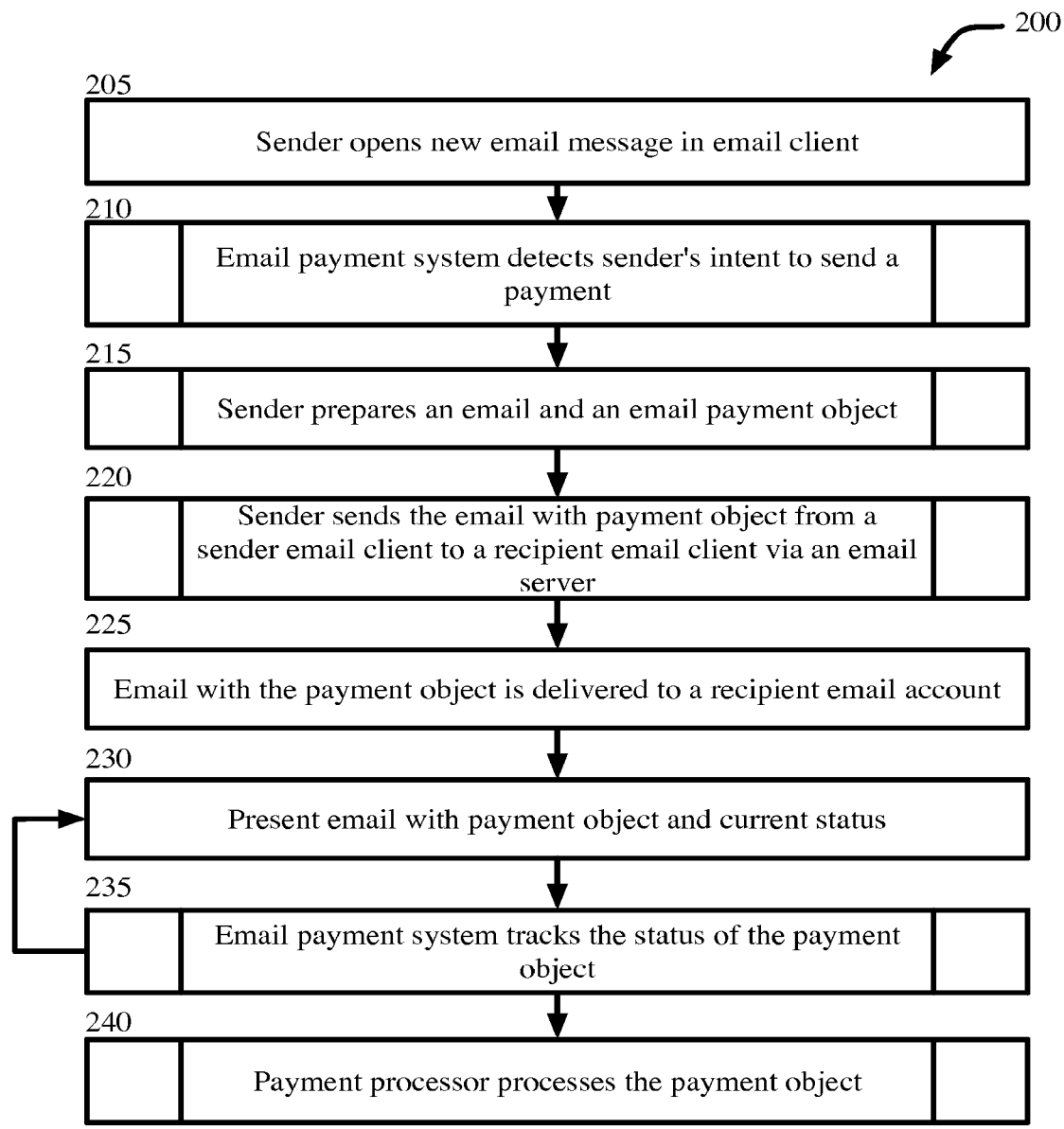
FIG. 2 is a block flow diagram depicting a method to manage email messages with payment objects, in accordance with certain example embodiments.

FIG. 2 is a block flow diagram depicting a method 200 to manage email messages with payment objects, in accordance with certain example embodiments.

Method 200 begins with block 205, where a sender opens a new email message in the sender email client 106 and composes an email to a recipient email account 147. An email payment system API, or other module for communicating with the email payment system 120 is stored within the email client module 106 and 107, or is stored on the sender device 105 and recipient device 110 in communication with the email client module 106 and 107. In addition, email payment module 125 provides a button or other user interface object to the email client module 106 for display in email messages generated by the email client module 106. The user interface object allows the sender to select the email payment option. For example, the user interface object may appears as a "s" next to the native attach file user interface object of the email client module 106.

At block 210, the email composition module 155 of the email payment system 120 analyzes the email for payment signals. Block 210 is described in further detail hereinafter with reference to FIG. 3.

Figure 3:
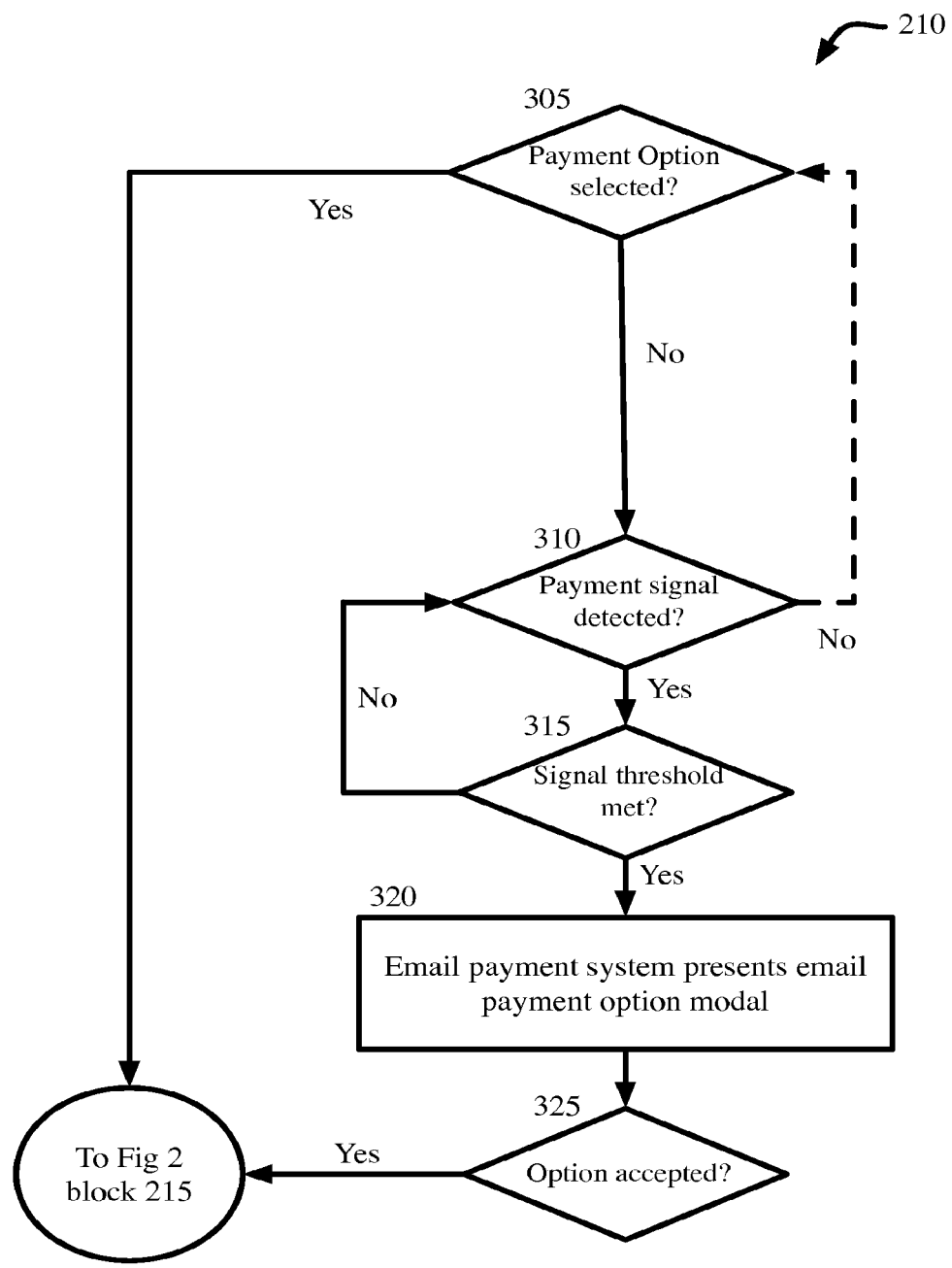
FIG. 3 is a block flow diagram depicting a method to detect a sender's intent within an email message to send a payment, in accordance with certain example embodiments.

FIG. 3 is a block flow diagram depicting a method 210 for analyzing an email for payment signals, in accordance with certain example embodiments.

Method 210 begins at block 305, where the email payment module 125 determines if the payment option has been selected by the user. If at any point during the composition of the email, the email payment module 125 detects that the sender has selected the payment option user interface object the method proceeds directly to block 215 of FIG. 2. If the payment option is not selected, the method proceeds to block 310.

At block 310, the email payment module 125 analyzes the email composition for one or more payment signals. A payment signal indicates the intent of the sender to send a payment to a recipient. In certain example embodiments, the payment signals may be defined by a decision function stored in the email payment module 125. The decision function may comprise a set of pre-defined payment signals. For example, signals like a "$" or a phrase like "I owe you" may be used to indicate the email relates to an intent to send payment. In addition, the decision function may be a machine learning derived decision function. In general, machine learning derived decision functions define a set of weights for a set of payment signals and a decision threshold value. If the decision function score is above the threshold value the payment signals detected indicate an intent to send a payment. Machine learning derived decision functions are able to continuingly learn from user responses and adjust the decision function accordingly. For example, if users regularly reject the email payment option when using the phrase "I owe you" in the email message, the weight value of the signal "I owe you" will be decreased by the machine-learning algorithm. If a payment signal is detected the method proceeds to block 315. If a payment signal is not detected the method terminates. In certain example embodiments, the method continues to analyze the email message for payment signals until the email message is sent or the email client application is closed.

At block 315, the email payment module 125 determines whether the signal threshold was met. In certain example embodiments, the detection of any of a number of pre-defined signals may meet the decision threshold. In certain other example embodiments, a combination of signals may be required, or the sum of their corresponding weights assigned by the decision function must be greater than the signal threshold. If the signal threshold is met, the method proceeds to block 320. If the signal threshold is not met, the method returns to block 310 where the email payment module 125 continues to analyze the email message for additional payment signals.

At block 320, the email payment module 125 presents an email payment option modal in the sender's email client module 106, providing the sender with user interface objects to accept or reject the use of the email payment option.

At block 325, the email payment module 125 receives either an acceptance or rejection of the email payment option via the email payment option modal. If the payment option is selected the method proceeds to block 215 of FIG. 2. If the payment option is not selected the method terminates.

Returning to FIG. 2 at block 215, where the email payment module 125 collects payment details from the sender and inserts a payment object in the sender's email. Block 215 is described in further detail hereinafter with reference to FIGS. 4 and 5.

Figure 4:
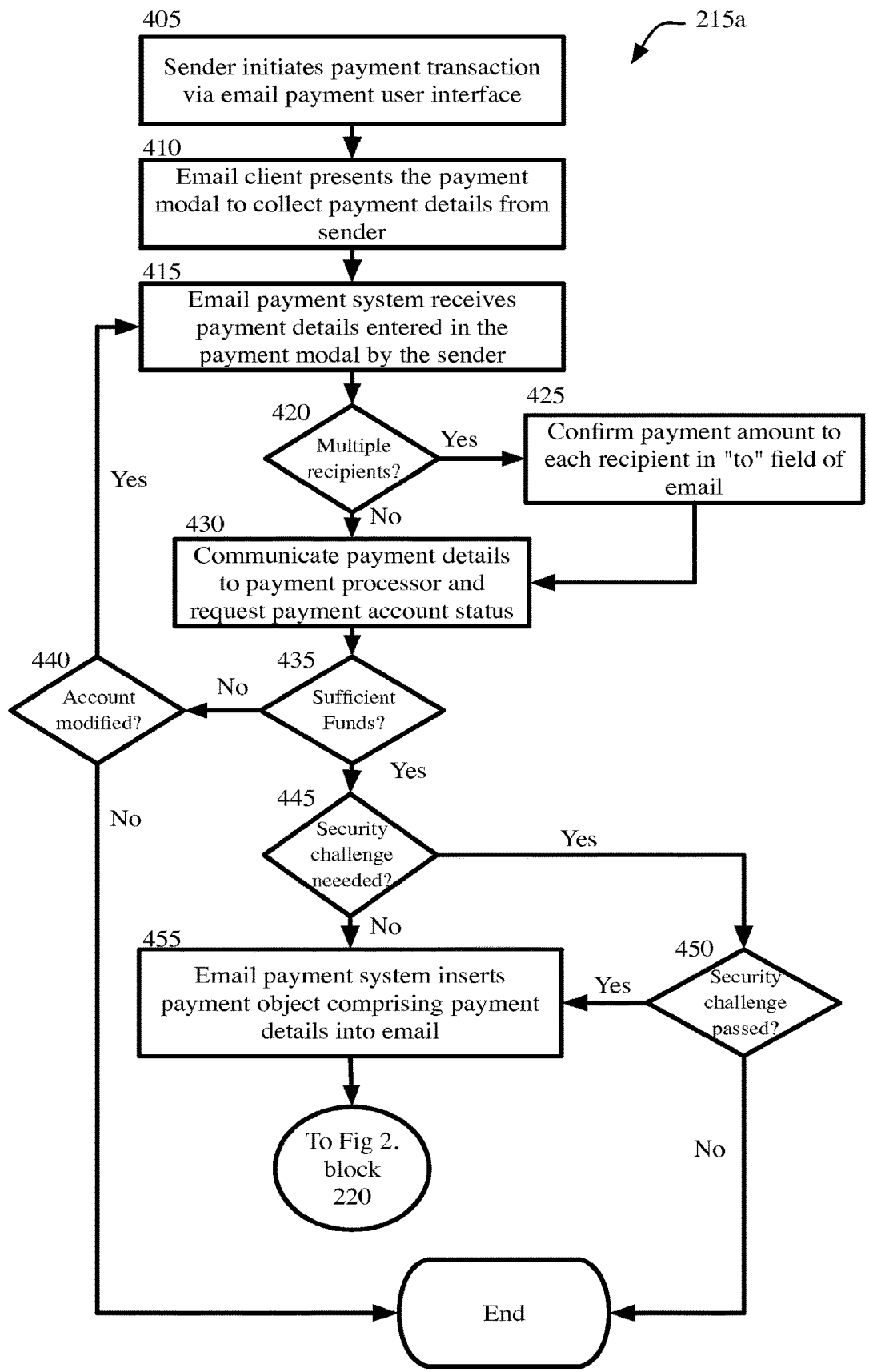
FIG. 4 is a block flow diagram depicting a method for preparing an email with a payment object comprising a payment, in accordance with certain example embodiments.

FIG. 4 is a block flow diagram depicting a method 215*a* for preparing an email with a payment object comprising a payment, in accordance with certain example embodiments.

Method 215*a* begins at block 405, where the sender initiates generation of a payment object by selecting the appropriate user interface object within the email client module 106.

At block 410, the email payment module 125 presents, via the email client module 106, a payment modal to collect payment details from the sender. The modal comprises fields for collecting payment details. Payment details may include a sender payment account identifier, a recipient email account identifier, a payment amount, and a payment instrument. In certain example embodiments, the sender payment identifier and the recipient email account identifier are the email address of the sender and the recipient respectively. The payment instrument may be one of several payment instruments associated with a sender electronic payment account 151, such as an electronic online wallet account. For example, the payment instrument may be a credit card account linked to the sender's electronic payment account 151, or it may be a payment account associated directly with the electronic payment account.

At block 415, the email payment module 125 receives payment details entered by the sender into the payment modal displayed in the sender's email client 106. In certain example embodiments, the recipient is restricted to email addresses designated in the email's "to" field.

At block 420, the email payment module 125 determines if there are multiple recipients in the "to" field of the email. If there are multiple recipients in the "to" field the method proceeds to block 425

At block 425, the email payment module 125 confirms the payment amount to each recipient in the "to" field of the email. For example, the email payment module 125 may present a multi-recipient modal via the email client module 106 to the sender listing each recipient and providing a field to indicate the payment amount for each recipient. In certain example embodiments, the email payment module 125 may list the same payment amount for each recipient in the multi-recipient modal by default. The sender, may then edit the payment amounts and add or remove recipients as needed in the multi-recipient modal and communicate those edits to the email payment module 125 by selecting a submit user-interface object displayed on the multi-recipient modal. The method then proceeds to block 430.

Returning to block 420, if the e-mail payment module 125 determines there is only a single recipient, the method proceeds directly to block 430.

At block 430 the email payment module 125 communicates the payment details to the payment processor 150 and requests a payment account status. Where the payment object indicates multiple payment recipients, the email payment module 125 may communicate payment details to the payment processor 150 for each recipient separately. The payment processor 150 uses the sender payment account identifier to access the sender electronic payment account 151 and verify there are sufficient funds associated with the selected payment instrument for each requested payment.

At block 435, the email payment module 125 receives a payment account status from the payment processor 150. If the payment account status indicates there are not sufficient funds to cover the payment amount indicated in the payment details the method proceeds to block 440.

At block 440, the email payment module 125 displays a modify account modal to the sender through the email client module 106. The modify account modal indicates the deficiency of funds and presents the sender with the option of modifying the payment details or canceling the payment transaction. If the sender elects to modify the account, the method returns to block 415 and steps 415 to 435 are repeated. The sender may modify the sender payment account 151, for example, by selecting a different payment instrument, or accessing the sender payment account 151 and authorizing the transfer of additional funds into the payment account, or by updating payment information associated with the sender payment account 151. If the sender elects to cancel the payment transaction, the method terminates. The sender may continue to compose and send the email without the payment object.

Returning to block 435, if the email payment module 125 receives confirmation from the payment processor 150 that there are sufficient funds available the method proceeds directly to block 445.

At block 445, the email payment module 125 determines if a security challenge is needed before allowing the payment transaction to be completed. For example, the email payment module 125 may determine if a security challenge is needed based on the dollar amount of the payment, the amount of payment instrument information stored in the sender electronic payment account 151, whether the payment is being made to someone within the sender's social network, or a combination thereof. The security challenge may require new payment account information such as full billing address, or the confirmation of known details such as the credit card number of the selected payment instrument. In certain other example embodiments, the security challenge may also require the sender to prove they are in possession of a validation code. For example, the email payment module 125 may send a text message containing a validation code to a cell phone number associated with the sender's email or payment account. If the email payment module 125 determines a security challenge is required the process proceeds to block 450.

At block 450, the email payment module 125 displays a security challenge modal to the sender via the email client module 106 and determines if the security challenge has been passed based on the information entered in the security challenge modal by the sender. If the security challenge is passed the method proceeds to block 455. If the security challenge fails, the method terminates. In certain example embodiments, the sender may be given a limited number of additional attempts to provide the correct security challenge verification information before the email payment process terminates.

Returning to block 445, if the email payment module 125 determines a security challenge is not required the method proceeds directly to block 455.

At block 455, the email payment module 125 inserts a payment object in the body of the email. In the sender's email client module 106 the payment object will display the recipient, the payment amount, and identifying information regarding the payment instrument or account being used. In the recipient email client module 107 the payment object may display information regarding the sender and the payment amount. The payment object may also include additional information. For example, a the payment object may incorporate a picture of the recipient or a sender, such as a picture associated with the recipient's contact information on the sender device 105 or recipient device 110. The payment object may also provide a field for the sender to enter a memo or other text. For example, the sender may indicate what the payment is for in the payment object. The method then proceeds to block 220 of FIG. 2.

Figure 5:
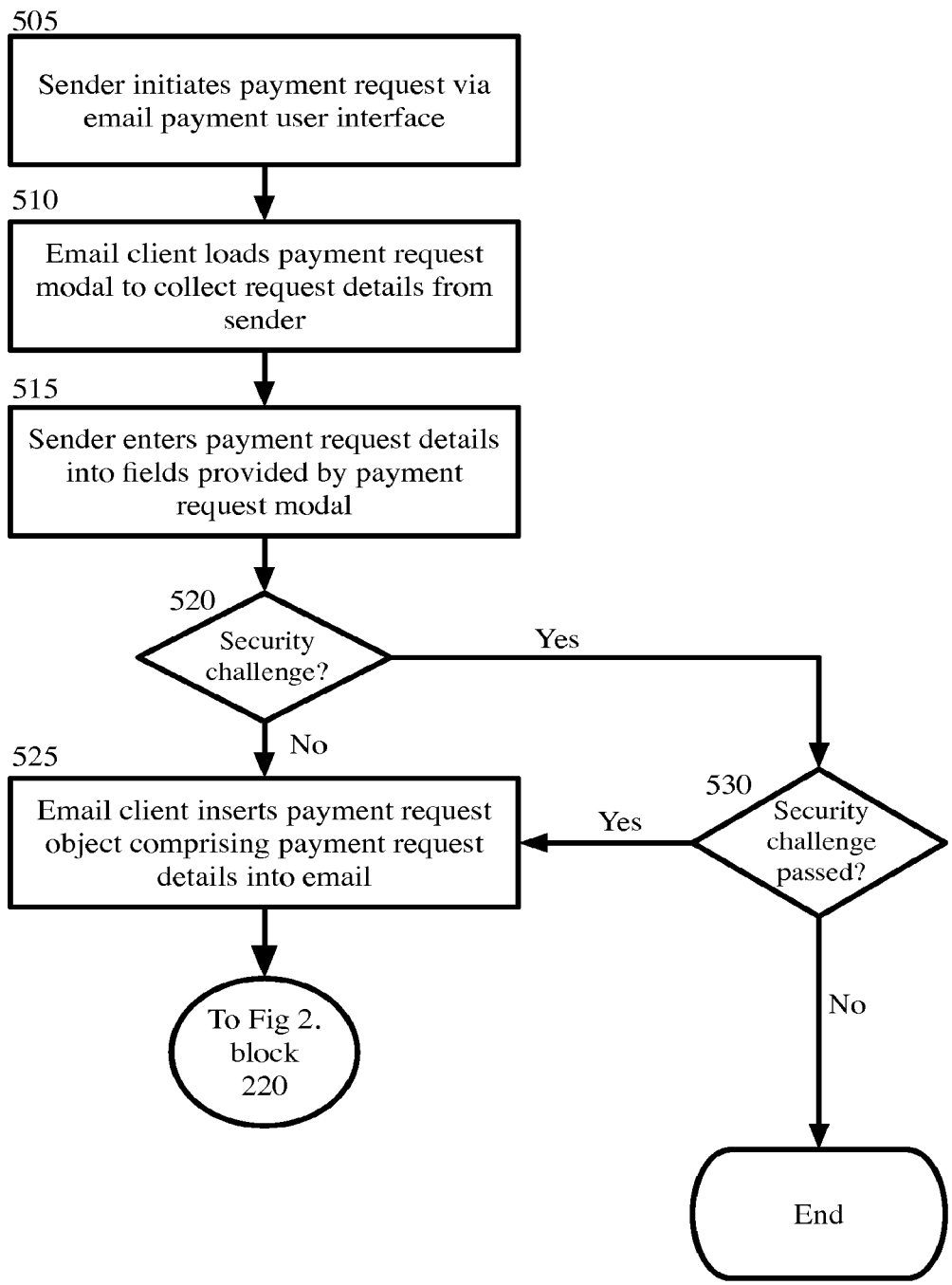
FIG. 5 is a block flow diagram depicting a method for preparing an email with a payment object comprising a payment request, in accordance with certain example embodiments.

FIG. 5 is a block flow diagram depicting a method 215b for preparing an email with a payment object comprising a payment request, in accordance with certain example embodiments.

Method 215b begins at block 505. Blocks 505 to 515 proceed substantially as described above regarding blocks 405 to 415 of FIG. 4, and blocks 520-530 proceed substantially as described above regarding blocks 445 to 455 of FIG. 4. In method 215b, instead of the payment object comprising a payment from the sender to the recipient, the payment object comprises a request for payment from the recipient to the sender. Like the payment object comprising a payment, the payment object comprising a payment request list the recipient or the sender depending on whether the sender or recipient is viewing the payment object and the amount requested but does not need to indicate a payment instrument identifier in the sender's view of the payment object. Additional information, such as a picture of the recipient or sender, or a memo regarding the nature of the request may be included as described above.

Returning to FIG. 2 at block 220, where the sender email client module 106 sends the email with payment object to a recipient email client module 107. Block 220 is described in further detail hereinafter with reference to FIG. 6.

Figure 6:
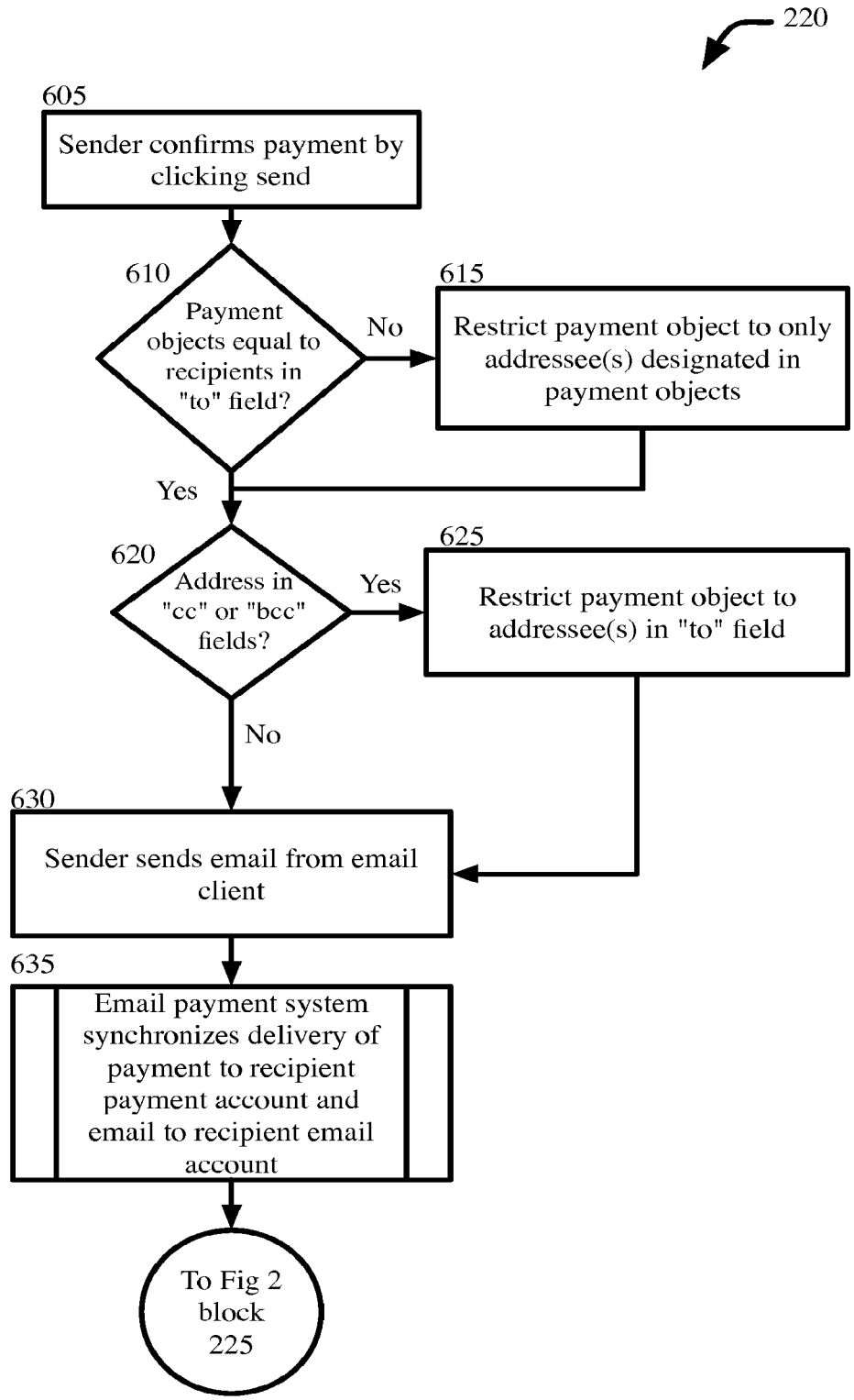
FIG. 6 is a block flow diagram depicting a method for sending an email with a payment object from a sender email client module to a recipient email client module, in accordance with certain example embodiments.

FIG. 6 is a block flow diagram depicting a method 220 for sending an email with a payment object from a sender email client module 106 to a recipient email client module 107 via an email server 145.

Method 220 begins at block 605, where the sender confirms the details of the payment object by clicking send.

At block 610, the email payment module 125 verifies that the number of payment objects included in the email are equal to the number of recipients designated in the "to" field of the email message. If the email payment module 125 detects more recipients in the "to" field than payment objects inserted in the email the method proceeds to block 615.

At block 615, the email payment module 125 restricts the payment object to only those recipients in the "to" with a matching payment object in the email. For example, the email payment module 125 may remove the payment object from copies of the outbound message from the email client module 106 to the email server 145 that are directed to a recipient without a corresponding payment object in the email.

In certain example embodiments, the email payment module 125 may also restrict sending a copy of the email with the payment object to group email addresses. In certain other example embodiments, the email client module 125 allows an email with a payment object to be sent to a group address but requires the designation of a group administrator email address, the group administrator being the only one authorized to accept or reject the payment object on behalf of the group. In certain other example embodiments, the email payment module 125 may also restrict the email with the payment object to recipients within a defined geographic region. For example, if existing regulations limit the sending of electronic payments to certain geographic regions, the email payment module 125 will remove the payment object from any recipient in the restricted geographic region. For example, the email payment module 125 may request the payment processor 150 verify that the physical address information associated with the recipient's payment account 152 is not within a restricted geographic region. If the physical address associated with the recipient's payment account 152 is in a restricted geographic region, the email payment module 125 will remove the payment object from the email to that recipient.

Returning to block 610, if there is only a single recipient and payment object, the method proceeds directly to block 620.

At block 620, the email payment module 125 determines if there are any recipients in the "cc" or "bcc" fields of the email message with the payment object. If there are recipients in the "cc" or "bcc" fields, the method proceeds to block 625.

At block 625, the email payment module 125 restricts payment to recipients in the "to" field as described above regarding block 615. For example, the email payment module 125 may remove the payment object from the copy of the email to the recipient's designated in the "cc" or "bcc" fields. Alternatively, the email payment module 125 may modify the payment object detail to show only the transaction details without including the user interface objects that would allow the "cc" or "bcc" recipient to accept or reject the payment.

Returning to block 620, if there are no recipients in the "cc" or "bcc" fields the method proceeds directly to block 630.

At block 630, the email server 145 routes the properly restricted emails with a payment object or objects to their designated recipients. In addition, the email payment module 125 communicates final payment details captured during generation of the payment object to the payment processor 125. The payment processor 150 uses the sender electronic payment account identifier to access the sender's corresponding electronic payment account 151 and the recipient's email account identifier to access the recipient's electronic payment account 152. The payment processor 150 will then transfer the requested funds from the sender's electronic payment account 151 to the recipients electronic payment account 152 pursuant to the synchronization steps described in further detail below with reference to FIG. 7. If the recipient does not currently have an electronic payment account, the payment processor 150 will hold processing of the payment request until a recipient electronic account is set up. A recipient without a registered electronic payment account will be prompted to set up such an account with the payment processor 150 after receipt of the email with the payment object as described in further detail below with reference to block 230 of FIG. 2.

At block 635, the delivery synchronization module 135 synchronizes posting of the payment in the sender electronic payment account 151 and recipient electronic payment account 152 with the delivery of the email with the payment object from the sender email account to the recipient email account. Block 635 is described in further detail hereinafter with reference to FIG. 7.

Figure 7:
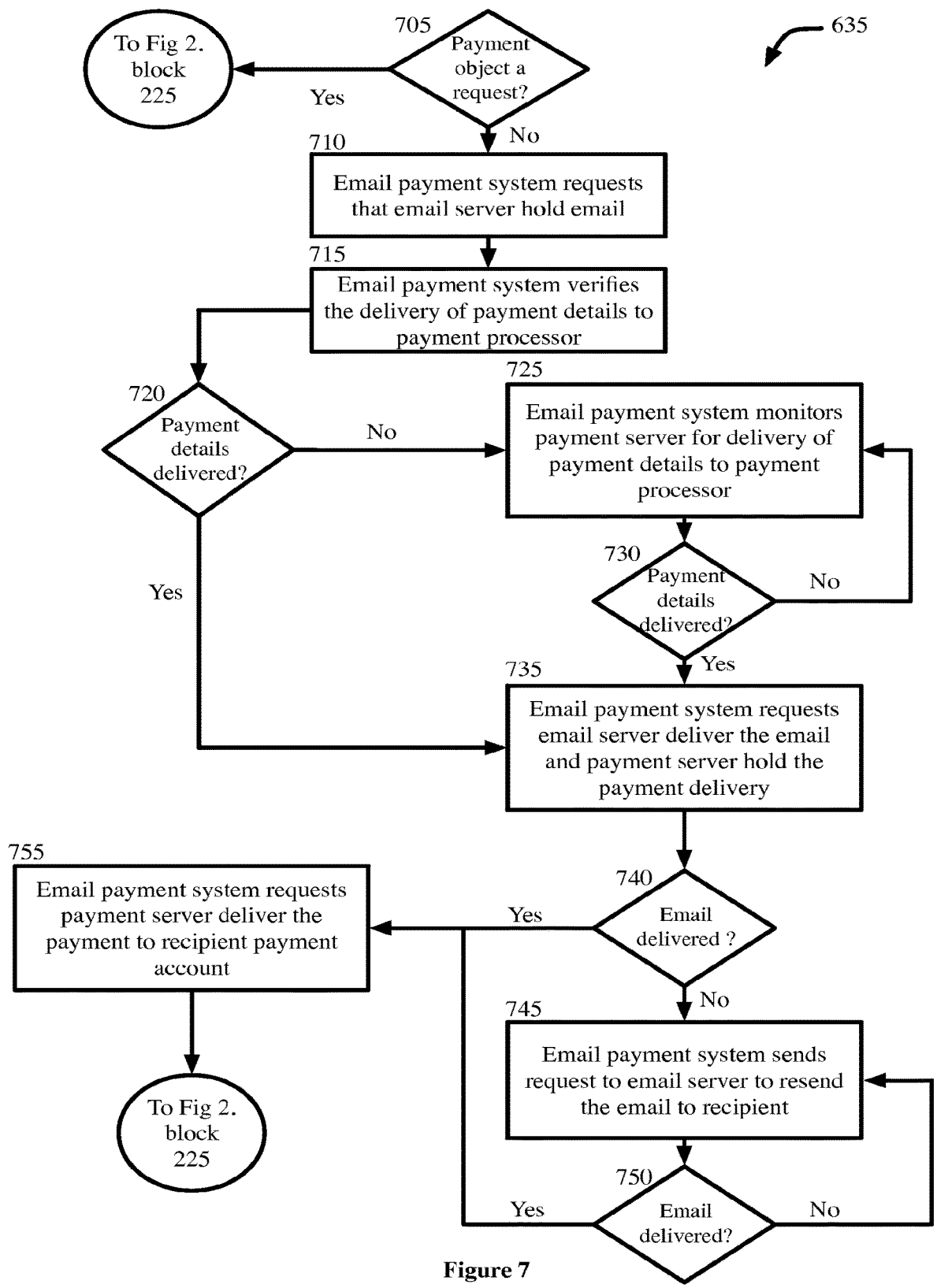
FIG. 7 is a block flow diagram depicting a method for synchronizing the delivery of an email with a payment object and the delivery of a corresponding payment from a sender payment account to a recipient payment account, in accordance with certain example embodiments.

FIG. 7 is a block flow diagram depicting a method 635 for synchronizing the delivery of an email with a payment object and the delivery of payment from a sender electronic payment account to a recipient electronic payment account, in accordance with certain example embodiments.

Method 635 begins at block 705, where the delivery synchronization module 135 determines if the email with a payment object comprises a payment or a payment request. If the payment object comprises a payment request no synchronization is required and the method proceeds directly to block 225 of FIG. 2. If the payment object comprises a payment, the method proceeds to block 710.

At block 710, the delivery synchronization module 135 requests that the email server 145 hold delivery of the email with the payment object until further confirmation from the delivery synchronization module 135 is received. For example, the delivery synchronization module 135 may wait until the payment processor confirms the payment details were received as described in block 715 below before sending further confirmation to the email server 145 to proceed with delivery of the email with the payment object to the recipient email client 107.

At block 715, the delivery synchronization module 135 requests verification from the payment processor 150 that the payment details where received. For example, the delivery synchronization module may request a confirmation that the final payment details sent by the email payment module 125, as described in block 630 of FIG. 6 above, were received. The delivery synchronization module 135 may identify the payment details by a transaction identifier assigned to email payment by the email payment module 125 and communicated by the email payment module 125 to the payment processor 150 with the final payment details. The payment processor 150 will use the transaction identifier to identify whether the payment details have been received and, in certain example embodiments, where the payment details are ready for processing. The payment processor 150 will then send a response to the delivery synchronization module 135 indicating whether the payment details were received or not.

At block 720, the delivery synchronization module 135 receives the response from the payment processor 150. If the delivery synchronization module 135 receives confirmation from the payment processor 150 that the payment details have been received, the method proceeds to block 735.

Returning to block 720, if the delivery synchronization module 135 receives a response from the payment processor 150 that the payment details have not been received, the method proceeds to block 725.

At block 725, the delivery synchronization module 135 communicates an additional verification request to the payment processor 150 because the payment processor 150 indicated the payment details had not been received at block 720 above.

At block 730, the delivery synchronization module 135 receives a response from the payment processor 150. If the delivery synchronization module 135 receives a response from the payment processor 150 that the payment processor 150 has not received the payment details, the delivery synchronization module 135 will continue to monitor the payment processor 150 for receipt of the payment details. For example, the delivery synchronization module 135 may send additional verification request to the payment processor 150 at regularly timed intervals. In certain example embodiments, a timeout period may be defined where if the timeout period is exceeded the method terminates. If the delivery synchronization module 135 receives confirmation from the payment processor 125 that the payment details have been received, the method proceeds to block 735.

At block 735, the delivery synchronization module 135 communicates a request to the email server 145 to deliver the email with the payment object to the designated recipients, and request the email server 145 send a confirmation to the delivery synchronization module 135 upon delivery. The delivery synchronization module 135 also communicates a request to the payment processor 150 to hold posting of the payment to the sender and recipient electronic payment account until the payment processor 150 receives further confirmation from the delivery synchronization module 135.

At block 740, the delivery synchronization module 135 receives a response from the email server 145 indicating whether delivery of the email was completed. If the delivery synchronization module 135 receives a confirmation from the email server 145 that the email with the payment object was delivered, the method proceeds directly to block 755. If the delivery synchronization module 135 receives a response from the email server 145 indicating that delivery has not been completed, the method proceeds to block 745.

At block 745, the delivery synchronization module 135 sends an additional delivery verification request to the email server 145.

At block 750, the delivery synchronization module 135 receives a response from the email server 145 indicating whether the email message with the payment object has been delivered. If the delivery synchronization module 135 receives confirmation that the email with the payment object was delivered, the method proceeds to block 755. If the delivery synchronization module 135 receives a response from the email server 145 that the email with the payment object has not yet been delivered, the delivery synchronization module 135 will continue to monitor the email server 145 for delivery of the email with the payment object. For example, the delivery synchronization module 135 may send additional delivery verification requests to the email server 145 at regularly timed intervals. In certain example embodiments, a timeout period may be defined where if the timeout period is exceeded the email payment process terminates. If the delivery synchronization module 135 receives confirmation from the email server 145 that the email has been delivered, the method proceeds to block 755.

At block 755, the delivery synchronization module 135 communicates a request to the payment processor 150 to post the payment to the recipient and sender electronic payment accounts 151 and 152, and the method returns to block 225 of FIG. 2.

Returning to FIG. 2 at block 225, where the e-mail server 145 delivers the e-mail with the payment object to each recipient's email account 147 for display the recipients email client 107. The method then proceeds to block 230.

At block 230, the email payment module 125 displays the payment object to the recipient within the email message. The payment object indicates the payment amount and any additional information entered by the sender, such as a memo indicating what the payment is for. The payment object will also display a user interface object, such as a button, that will allow the recipient to accept the payment object, reject the payment object, or access their electronic payment account 152 to view additional transaction details. If the recipient does not have a registered electronic payment account 152, the access user interface object and the accept payment user interface object will connect the recipient to a web landing page or other user interface that allows the recipient to set up an electronic payment account 152 with the payment processor 150.

At block 235, the transaction monitor module 140 monitors the status of the payment object until the payment object is either accepted or rejected. Block 230 is described in further detail hereinafter with reference to FIGS. 8 and 9.

Figure 8:
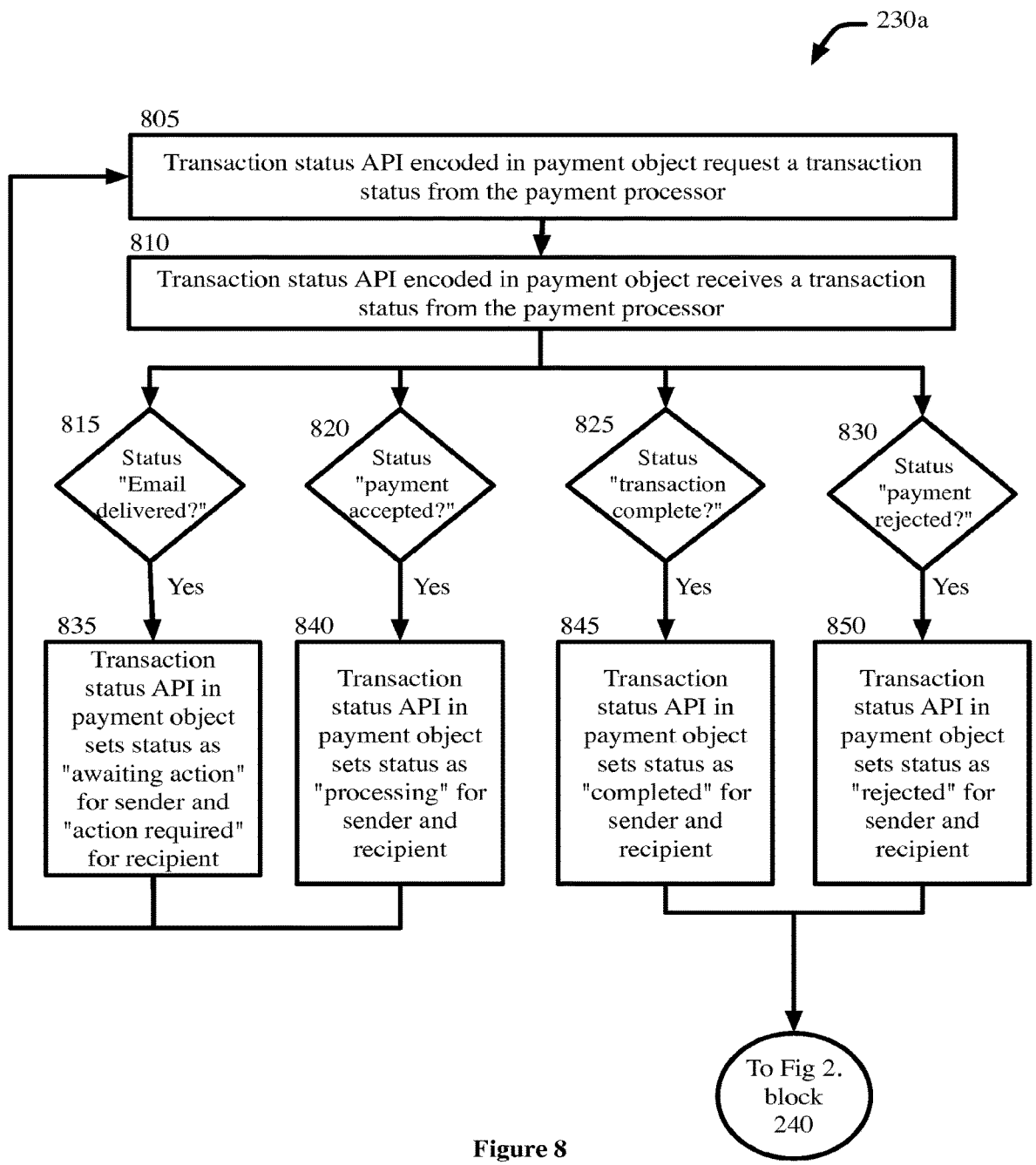
FIG. 8 is a block flow diagram depicting a method to track the status of a payment object comprising a payment, in accordance with certain example embodiments.

FIG. 8 is a block flow diagram depicting a method 230a for tracking the status of a payment object comprising a payment, in accordance with certain example embodiments.

Method 230a begins at block 805, where the transaction monitor module 140 requests a transaction status from the payment processor 150. In certainly example embodiments, the transaction monitor module 140 comprises a transaction status API encoded in the payment object. For example, the transaction monitor module 140 may be encoded in a hypertext markup language used to display the email message. The transaction monitor module 140 displays the status of the transaction in the payment object. In certain example embodiments the transaction monitor module 140, also displays the transaction status elsewhere in the e-mail, such as in the subject line of the email message. Where the transaction status is displayed in the subject line, the transaction status of the payment object is displayed to the sender and recipient without requiring display of the body of the payment object. The transaction monitor module 140 may request a transaction status update from the payment processor 150 at regularly timed intervals while the sender or recipient email client module 106 and 107 is running In certain example embodiments, the transaction monitor module 140 may request a transaction status update from the payment processor 150 every time the email client module 106 or 107 receives a request to display the email with the payment object. Where the transaction status update occurs during the display of the email with the payment object the update of the transaction status is displayed in real time while the sender or recipient is viewing the email message.

At block 810, the transaction monitor module 140 receives the transaction status update from the payment processor 150. The status update may be one of the four example status updates indicated in blocks 815, 820, 825, and 830.

If the status is "email delivered" the method proceeds to block 835. At block 835, the transaction monitor module 140 sets the transaction status in the email with the payment object in the sender's email client module 106 to "awaiting action" and to "action required" in the email with the payment object in the recipient's email client module 107. In certain example embodiments, sent emails with a payment object may be displayed in a separate sent email payment folder in the sender's email client module 106 so that the status of the email with payment object may be more readily tracked by the sender when viewing their inbox. Likewise, emails with payment objects may be presented to the recipient in a distinct section of the recipient's email client module 107 inbox. In certain other example embodiments, emails with payment objects are marked with a unique identifier, such as a "$" wherever they may be stored and displayed within an email client module 106 and 107. The transaction monitor module 140 then continues to monitor the transaction status of the payment and blocks 805 and 810 are repeated.

If the status is "payment accepted" the method proceeds to block 840. At block 840, the transaction monitor module 140 updates the transaction status of the sender and recipient's copy of the email with the payment object to "processing" as described above at block 835. The transaction monitor module 140 then continues to monitor the transaction status and blocks 805 and 810 are repeated.

If the status is "transaction complete" the method proceeds to block 845. At block 845, the transaction monitor module 140 updates the transaction status of the sender and recipients' copy of the email with the payment object to "completed" as described above at block 835, and the method proceeds to block 240 of FIG. 2.

If the status is "payment rejected," the method 230a proceeds to block 850. At block 850, the transaction monitor module 140 updates the transaction status of the sender and recipient's copy of the email with the payment status to "payment rejected" as described above with reference to block 835. In certain instances, a recipient may delete the email without either accepting or rejecting the email via the payment object. In certain example embodiments, the transaction monitor module 140 may request a final transaction status update after a defined period of time. If no action has been taken by the recipient, the transaction monitor module 140 updates the transaction status of the sender's copy of the email payment object as "rejected" and the transaction status of the recipient's copy of the email with payment object, if not previously deleted, as "expired." The transaction monitor module 140 then communicates an instruction to terminate the payment transaction to the payment processor 150. The method then proceeds to block 240 of FIG. 2.

Figure 9:
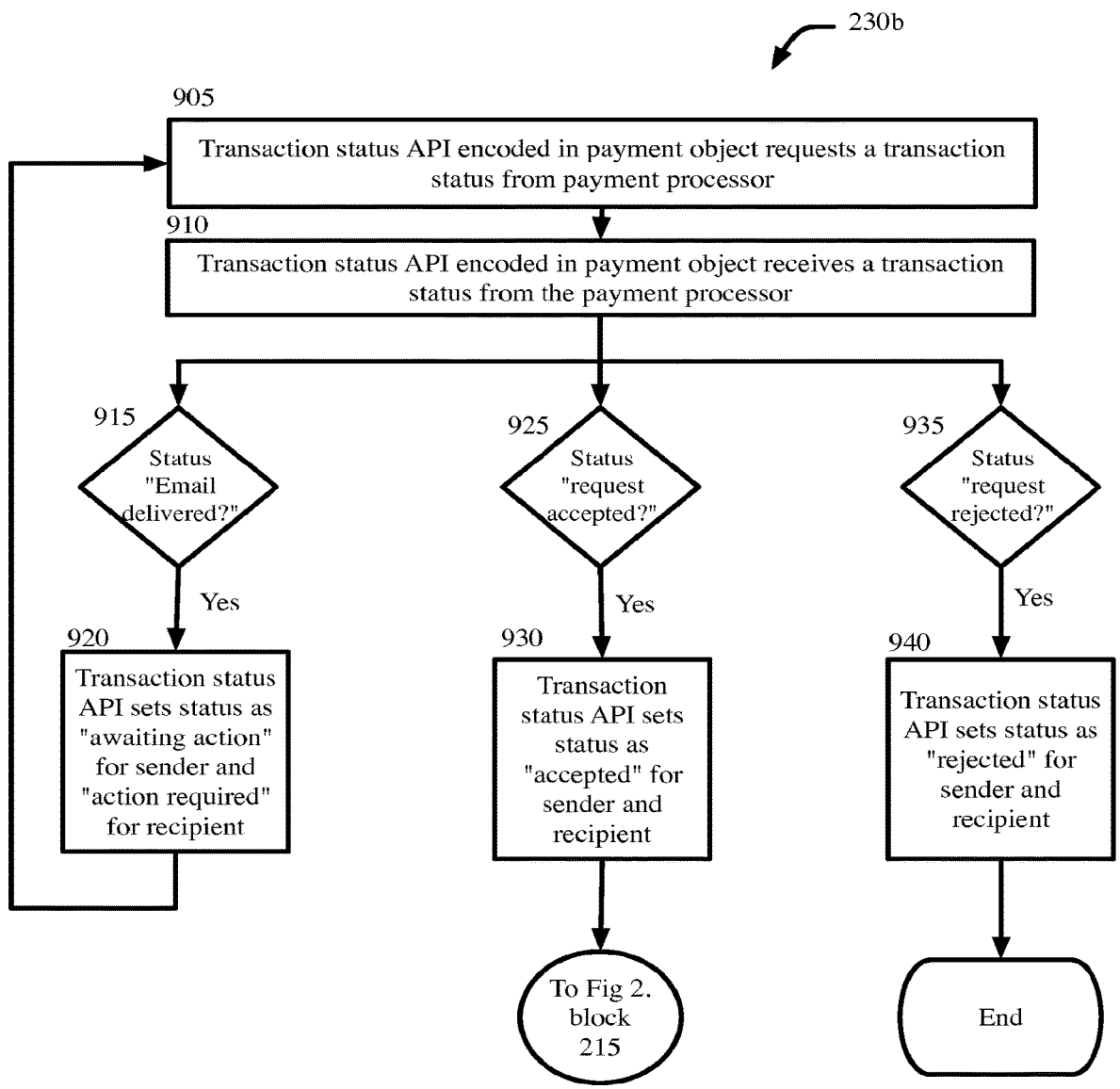
FIG. 9 is a block flow diagram depicting a method to track the status of a payment object comprising a payment request, in accordance with certain example embodiments.

FIG. 9 is a block flow diagram depicting a method 230b for tracking the status of a payment object comprising a payment request, in accordance with certain example embodiments.

Method 230b begins at block 905. Blocks 905 to 910 proceed substantially as described above regarding blocks 805 to 810 of FIG. 8 and blocks 915, 925 and 935 proceed substantially as described above regarding blocks 815, 820, and 830, of FIG. 8.

The status may be one of the three example status updates indicated in blocks 915, 925, or 935. If the status update is "email delivered" the method proceeds to block 920. At block 920 the, the transaction monitor module 140 sets the transaction status in the email with the payment object in the sender's email client module 106 to "awaiting action" and to "action required" in the email with the payment object in the recipient's email client module 107.

If the status update is "request accepted" the method proceeds to block 930. At block 930 the transaction monitor module 140 sets the transaction status in the email with the payment object in the sender's email client module 106 and the recipient's email client module 107 to "accepted." The recipient of the payment request then becomes the sender of a payment and the method proceeds to block 215 of FIG. 2 rather than block 240 of FIG. 2. For example, by accepting the request for payment, the initial recipient of the email payment object has agreed to pay the initial sender the requested amount. The initial recipient now becomes the new sender of a payment and the initial sender the new recipient of the payment. The new sender may then utilize the electronic payment system to complete the requested payment.

If the status update is "request rejected" the method proceeds to block 940. At block 940, the transaction monitor module 140 sets the transaction status in the email with the payment object in the sender's email client module 106 and the recipient's email client module 107 to "rejected." The method then terminates rather than proceeding to block 240 of FIG. 2.

Returning to FIG. 2 at block 240, where the payment processor 150 processes the payment object. Block 240 is described in further detail hereinafter with reference to FIG. 10.

Figure 10:
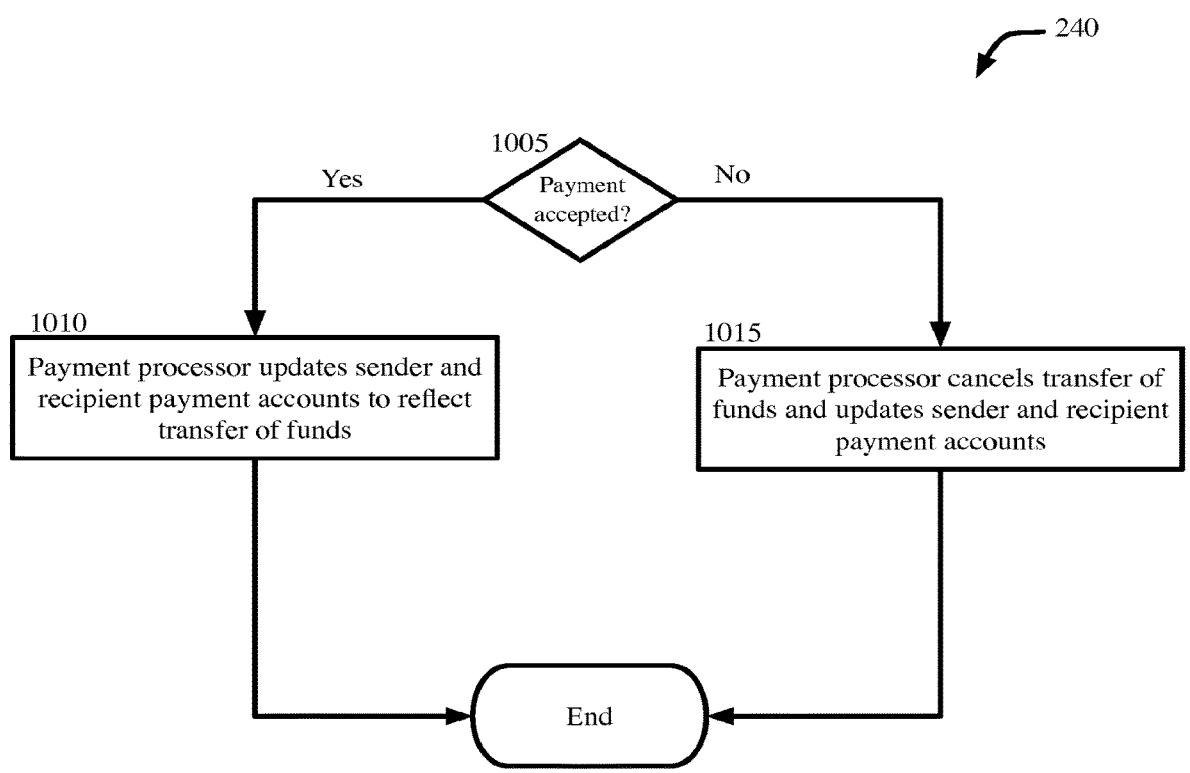
FIG. 10 is a block flow diagram depicting a method for processing a payment object using a payment processor, in accordance with certain example embodiments.

FIG. 10 is a block flow diagram depicting a method 240 for processing the payment in the payment object by a payment processor, in accordance with certain example embodiments.

Method 240 begins at block 1005, where the payment processor 150 receives a notification from the transaction monitor module 140 that the payment object was either accepted or rejected by the recipient. If the payment object is accepted, the method proceeds to block 1010.

At block 1010, the payment processor 150 transfers the payment amount indicated in the payment object from the sender's electronic payment account 151 to the recipient's payment account 152. When a sender then accesses the sender electronic payment account 151, the transfer of the funds to the recipient electronic payment account 152 is displayed. Likewise, when the recipient accesses the recipient payment account 152, the payment from the sender electronic payment posted to the recipient payment account is displayed. The method 240 then terminates Returning to block 1005, if the payment processor 150 receives a notification from the transaction monitor module 140 that the payment objet was rejected the method proceeds to block 1015.

At block 1015, the payment processor 150 cancels the payment and updates the sender electronic payment account 151 by refunding the transferred funds to the sender electronic payment account 151. The method 240 then terminates.

Example Systems

Figure 11:
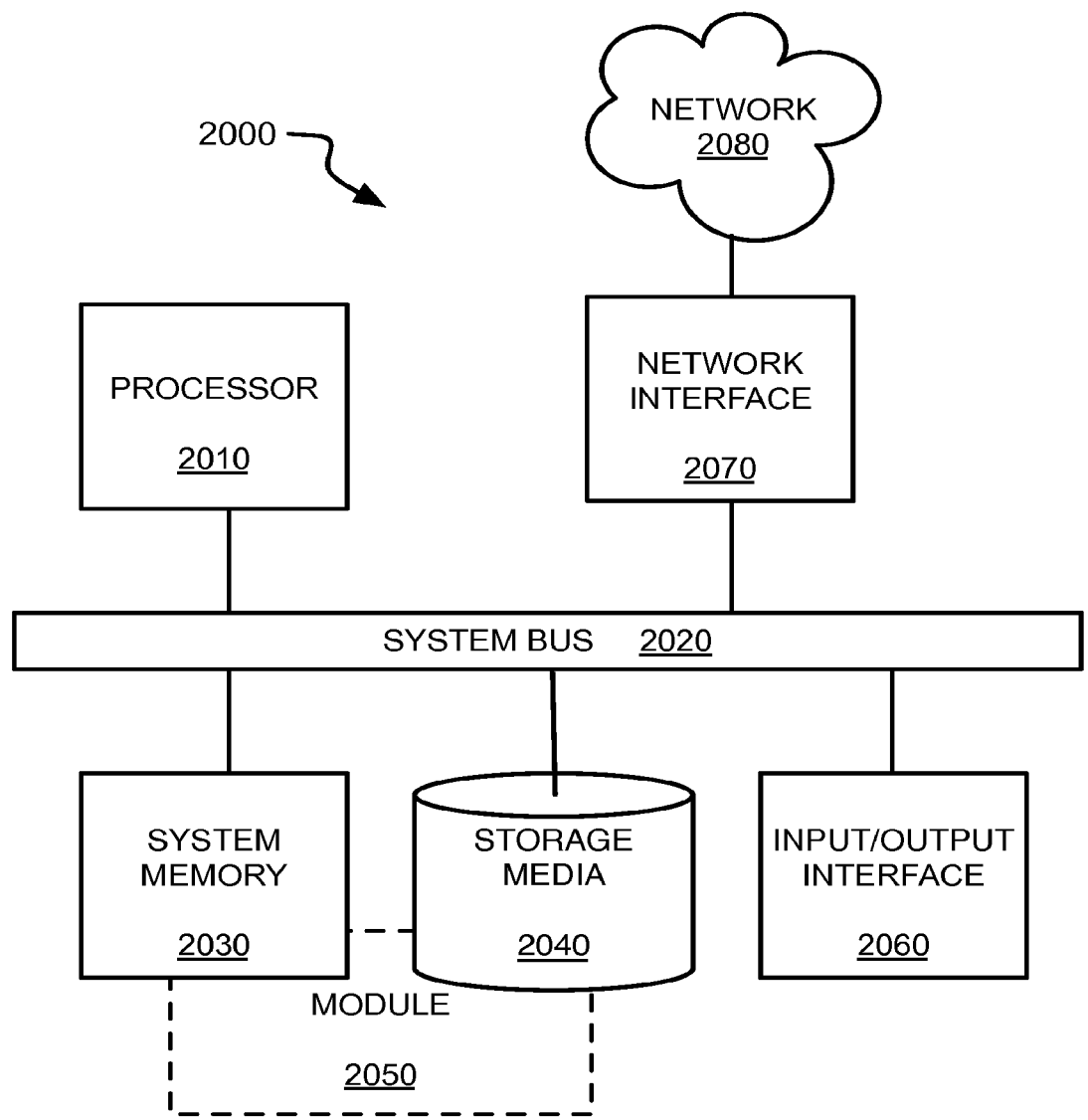
FIG. 11 is a block diagram depicting a computing machine and a module, in accordance with certain example embodiments.

FIG. 11 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A method to communicate email payment objects in email messages to recipients identified in a To field while restricting redeemable email payment objects from being communicated to recipients identified in CC or BCC fields, comprising:
    inserting, by one or more computing devices, one or more payment objects into one or more email messages, the one or more payment objects comprising at least one interface object to allow one or more recipients to accept a payment;
    modifying, by the one or more computing devices, the one or more payment objects for each instance of the one or more email messages addressed to one or more recipients identified in a CC field or a BCC field of the one or more email messages to remove the at least one interface object, wherein the one or more email messages addressed to each one of one or more recipients identified in the TO field of the one or more email messages includes the one or more payment objects as originally inserted; and
    transmitting, by the one or more computing devices, the one or more email messages to the one or more recipients.

2. The method of claim 1, wherein the one or more payment objects are coded in a hypertext mark-up language in a body of the one or more email messages.

3. The method of claim 1, wherein the one or more email messages are inserted in an email client of a sender.

4. The method of claim 1, further comprising receiving, by the one or more computing devices, a request from a sender email client to insert the one or more payment objects in the one or more email messages composed in the sender email client and addressed to the one or more recipients.

5. The method of claim 1, further comprising receiving, using the one or more computing devices, from a sender email client, payment transaction details related to the one or more payment objects input to the sender email client.

6. A computer program product, comprising:
    a non-transitory computer-readable storage device having computer-executable program instructions embodied thereon that when executed by a computer cause the computer to communicate email payment objects in email messages to certain recipients while restricting the email payment objects from being communicated to recipients in restricted geographic regions, the computer-executable program instructions comprising:
    computer-executable program instructions to insert one or more payment objects into one or more email messages, the one or more payment objects comprising at least one interface object to allow one or more recipients to accept a payment;
    computer-executable program instructions to modify the one or more payment objects for one or more of the one or more email messages addressed to each one of one or more recipients identified in a CC field or a BCC field of the one or more email messages to remove the at least one interface object; and
    computer-executable program instructions to transmit the one or more email messages with the one or more payment objects to the one or more recipients that are not in a restricted geographic region.

7. The computer program product of claim 6, wherein the one or more payment objects are coded in a hypertext mark-up language in a body of the email message.

8. The computer program product of claim 6, wherein the one or more email messages are inserted in an email client of a sender.

9. The computer program product of claim 6, further comprising computer-executable program instructions to receive a request from a sender email client to insert the one or more payment objects in an email message composed in the sender email client and addressed to the one or more recipients.

10. The computer program product of claim 6, further comprising computer-executable program instructions to receive, from a sender email client, payment transaction details related to the one or more payment objects input to the sender email client.

11. A system to communicate one or more payment objects in one or more email messages to groups with group administrators, comprising:
- a storage device;
- a network device; and
- a processor communicatively coupled to the storage device and the network device, the processor executing application code instructions that are stored in the storage device to cause the system to:
- insert one or more payment objects into one or more email messages, the inserted one or more payment objects comprising at least one interface object to allow one or more recipients to accept the payment;
- modify the one or more payment objects for each instance of the one or more email messages addressed to each one of one or more recipients identified in a CC field or a BCC field of the one or more email messages to remove the at least one interface object; and
- transmit the one or more email message to the one or more recipients.

12. The system of claim 11, wherein the one or more payment objects are coded in a hypertext mark-up language in a body of the email message.

13. The system of claim 11, wherein the one or more email messages are inserted in an email client of one or more senders.

14. The system of claim 11, further comprising application code instructions to receive a request from a sender email client to insert the one or more payment objects in one or more email messages composed in a sender email client of one or more senders and addressed to the one or more recipients.

15. The system of claim 11, further comprising application code instructions to receive from a sender email client of one or more senders, payment transaction details related to the one or more payment objects input to the sender email client.

* * * * *